United States Patent Office 3,110,716
Patented Nov. 12, 1963

3,110,716
DERIVATIVES OF 3,6-DISUBSTITUTED-7-SULF-
AMYLBENZOTHIADIAZINE DIOXIDES
William M. McLamore, Kew Gardens, and Gerald D.
Laubach, Jackson Heights, N.Y., assignors to Chas.
Pfizer & Co., Inc., New York, N.Y., a corporation of
Delaware
No Drawing. Filed Feb. 17, 1958, Ser. No. 715,482
6 Claims. (Cl. 260—243)

This invention is concerned with a new class of highly effective therapeutic agents as well as the method of preparing same. In particular, the therapeutic agents of this invention are 3,6-disubstituted-7-sulfamylbenzo-1,1-dioxo-1-thia-2,4-diazines which have proved to be valuable diuretic agents. These compounds, hereinafter referred to as 3,6-disubstituted-7-sulfamylbenzothiadiazine dioxides, are represented by the following formulae:

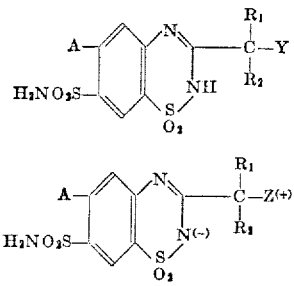

wherein
(a) A is selected from the group consisting of Cl, F, Br, $NO_2$, alkanoyl containing 2 to 4 carbon atoms, trifluoromethyl, and alkyl and alkoxy each containing from 1 to 3 carbon atoms;
(b) $R_1$ and $R_2$ are selected from the group consisting of hydrogen, alkly containing from 1 to 3 carbon atoms, phenyl, and alkaryl and aralkyl each containing from 7 to 8 carbon atoms;
(c) Y is selected from the group consisting of piperidino, pyrryl, pyrrolidino and morpholino and

in which $R_1$ and $R_2$ are as defined above and
(d) Z is selected from the group consisting of pyridinium, pyrimidinium, thiazolium, pyrazinium, N-alkylpiperidino, N-alkylpyrryl, N-alkylpyrrolidino and N-alkylmorpholino, the N-alkyl of each containing 1 to 3 carbon atoms and

in which $R_1$ and $R_2$ are as defined above and $R_3$ is alkyl containing 1 to 3 carbon atoms.

Although in the above formulae reference is made to a preferred carbon content of the described alkanoyl and hydrocarbon substituents, 3,6-disubstituted-7-sulfamylbenzothiadiazine dioxide containing similar groups with higher carbon content may be employed. However, the therapeutic activity of such compounds may tend to decrease. Further, since 3,6-disubstituted-7-sulfamylbenzothiadiazine dioxide containing alkanoyl and hydrocarbon substituents of higher carbon content provide no appreciable advantage and the starting compounds for the production of said compounds are generally less economically advisable, they are not preferred.

It is also intended to include within the scope of this invention the acid and base addition salts of the above class of amphoteric compounds, said acid containing a pharmacologically acceptable anion, said base containing a pharmacologically acceptable cation.

Exemplary of the compounds in which Y is

wherein $R_1$ and $R_2$ are as described above are compounds such as:
3-(2-N-methylamino-2-propyl)-6-nitro-7 - sulfamylbenzothiadiazine dioxide;
3-(α-N-propylamino-α-phenylethyl)-6-propoxy - 7-sulfamylbenzothiadiazine dioxide;
3-(α-N-anilino-α-butyl)-6-chloro - 7-sulfamylbenzothiadiazine dioxide;
3-(γ-N-o. toluidino-γ-phenylpropyl)-6-propyl-7-sulfamylbenzothiadiazine dioxide;
3 - /(N - ethyl, N-methylamino) (diphenyl)methyl-6-chloro-7-sulfamylbenzothiadiazine dioxide;
3 - (α - N,N -dipropylamino-α-p-methylbenzyl-6-bromo-7-sulfamylbenzothiadiazine dioxide;
3-(α - N,N - dimethylamino-α-p-ethylbenzyl)-6-bromo-7-sulfamylbenzothiadiazine oxide;
3-(N-benzylaminomethyl) - 6-chloro-7-sulfamylbenzothiadiazine dioxide;
3-(2 - phenylethylamino-2-propyl)-6-nitro-7-sulfamylbenzothiadiazine dioxide;
3-(α-N-p-toluidino-α-ethyl)-6-methoxy - 7 - sulfamylbenzothiadiazine dioxide;
3 - (N-methylanilinomethyl) - 6-methyl-7-sulfamylbenzothiadiazine dioxide;
3-(aminomethyl)-6-chloro-7 - sulfamylbenzothiadiazine dioxide;
3-(2-amino-2-propyl) - 6 - bromo-7-sulfamylbenzothiadiazine dioxide;
3 - (1 - amino - 1 - butyl)-6-chloro-7-sulfamylbenzothiadiazine dioxide;
3-(α-aminobenzyl)-6-chloro - 7 - sulfamylbenzothiadiazine dioxide;
3-(2-amino-2-propyl)-6-fluoro-7-sulfamylbenzothiadiazine dioxide;
3-(1-amino-1-butyl)-6-acetyl-7 - sulfamylbenzothiadiazine dioxide;
3-(aminomethyl) - 6 - trifluoromethyl-7-sulfamylbenzothiadiazine dioxide;
3-(amino-methyl)-6-butyryl-7 - sulfamylbenzothiadiazine dioxide;
3-(2-amino - 2 - propyl) - 6 - acetyl-7-sulfamylbenzothiadiazine dioxide.

Examplary of compounds in which Y is a heterocyclic radical as described above are compounds such as
3-(N-piperidinomethyl) - 6 - chloro - 7 - sulfamylbenzothiadiazine dioxide;
3 - (N - pyrrylmethyl) - 6 - chloro-7-sulfamylbenzothiadiazine dioxide;
3-(N-piperidinomethyl)-6-methyl-7 - sulfamylbenzothiadiazine dioxide;
3 - (α - N-pyrrolidino-α-ethyl)-6-methoxy-7-sulfamylbenzothiadiazine dioxide;
3-(α-N-morpholino-α-benzyl)-6-methyl-7 - sulfamylbenzothiadiazine dioxide;
3-(α-N-piperidino-α-ethyl) - 6 - methoxy-7-sulfamylbenzothiadiazine dioxide;
3 - (2-N-piperidino-2-propyl)-6-nitro-7-sulfamylbenzothiadiazine dioxide;
3-(α-N-pyrrolidino-α-phenylethyl)-6-propoxy-7 - sulfamylbenzothiadiazine dioxide;
3-(N-piperidinomethyl) - 6-fluoro-7-sulfamylbenzothiadiazine dioxide;

3-(2-N-pyrryl-2-propyl)-6-fluoro-7-sulfamylbenzothiadiazine dioxide.

The therapeutic agents of this invention in which Z is a heterocyclic radical, an N-alkylheterocyclic radical or

as described above may be represented by the following formula

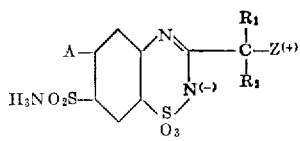

This formula is a quaternary ammonium zwitter-ion formula. A zwitter-ion is a complex ion that is both positively and negatively charged. The negative charge in this formula resides on the imide nitrogen of the thiadiazine ring. The positive charge resides on the nitrogen atom of group Z.

The benzothiadiazine dioxides in which Z is a heterocyclic radical are exemplified by the following, which are zwitter-ions:

3-(N-pyridiniummethyl)-6-chloro-7-sulfamylbenzothiadiazine dioxide;
3-(N-pyraziniummethyl)-6-bromo-7-sulfamylbenzothiadiazine dioxide;
3-(N-pyridiniumethyl)-6-methyl-7-sulfamylbenzothiadiazine dioxide;
3-(1-N-thiazolium-1-ethyl)-6-methoxy-7-sulfamylbenzothiadiazine dioxide;
3-(2-N-pyridinium-2-propyl)-6-nitro-7-sulfamylbenzothiadiazine dioxide;
3-(α-N-thiazolium-α-phenylethyl)-6-propoxy-7-sulfamylbenzothiadiazine dioxide;
3-(N-pyrimidiniummethyl)-6-bromo-7-sulfamylbenzothiadiazine dioxide;
3-(α-N-pyridinium-α-phenylethyl)-6-propoxy-7-sulfamylbenzothiadiazine dioxide;
3-(N-thiazoliummethyl)-6-chloro-7-sulfamylbenzothiadiazine dioxide;
3-(N-pyridiniummethyl)-6-fluoro-7-sulfamylbenzothiadiazine dioxide;
3-(N-pyridiniummethyl)-6-trifluoromethyl-7-sulfamylbenzothiadiazine dioxide
and so forth.

Exemplary of the compounds in which Z is

or an N-alkylheterocyclic radical are quaternary ammonium compounds, for example, the zwitter ions:

3-(N-methylpiperidinomethyl)-6-chloro-7-sulfamylbenzothiadiazine dioxide;
3-(N-methylpyrrylmethyl)-bromo-7-sulfamylbenzothiadiazine dioxide;
3-(2-N,N,N-trimethylamino-2-propyl)-6-nitro-7-sulfamylbenzothiadiazine dioxide;
3-(N,N,N-triethylaminomethyl)-6-choro-7-sulfamylbenzothiadiazine dioxide;
3-(N,N,N-triproplyaminomethyl)-6-chloro-7-sulfamylbenzothiadiazine dioxide;
3-(N,N,N-triethylaminomethyl)-6-methyl-7-sulfamylbenzothiadiazine dioxide;
3-(α-N-methylpyrrolidino-α-ethyl)-6-methoxy-7-sulfamylbenzothiadiazine dioxide;
3-(2-N-ethylpiperidino-2-propyl)-6-nitro-7-sulfamylbenzothiadiazine dioxide;
3-(N-methylpyrrylmethyl)-6-bromo-7-sulfamylbenzothiadiazine dioxide;
3-(α-N-ethylpyrrolidino-α-phenylethyl)-6-propoxy-7-sulfamylbenzothiadiazine dioxide;
3-(α-N,N-dimethyl p-toluidino-α-ethyl)-6-methoxy-7-sulfamylbenzothiadiazine dioxide;
3-(N,N-diethyl, N-benzylaminomethyl)-6-chloro-7-sulfamylbenzothiadiazine dioxide;
3-(α-N,N-dimethylanilino-α-butyl)-6-chloro-7-sulfamylbenzothiadiazine dioxide;
3-(N-methylpiperidinomethyl)-6-fluoro-7-sulfamylbenzothiadiazine dioxide;
3-(2-N-methylpyrryl-2-propyl)-6-fluoro-7-sulfamylthiadiazine dioxide.

The valuable therapeutic agents of this invention may be prepared from a 5-substituted-2,4-disulfamylaniline in a two step process which first involves α-haloacylation of the aniline compound to produce a 5-substituted-2,4-disulfamyl (α-halo)acylanilide and then treatment of this product with an amine or ammonia. 5-substituted-2,4-disulfamyl-(α-halo)acylanilide may be represented by the following formula:

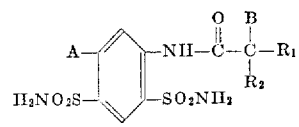

wherein (a) A is selected from the group consisting of Cl, F, Br, NO₂, alkanoyl containing 2 to 4 carbon atoms, trifluoromethyl, and alkyl and alkoxy each containing from 1 to 3 carbon atoms;

(b) is selected from the group consisting of F, Cl, Br and I;

(c) R₁ and R₂ are selected from the group consisting of hydrogen, alkyl groups containing from 1 to 3 carbon atoms, phenyl and arkalkyl and aralkyl each containing from 7 to 8 carbon atoms.

As mentioned above, the carbon content of the alkanoyl and hydrocarbon substituents represents the preferred range. Substituents of higher carbon content may be employed but are not preferred for reasons as explained above. Representative compounds of this type are:

5-chloro-2,4-disulfamyl (α-chloro)acetanilide;
5-bromo-2,4-disulfamyl (α-chloro)acetanilide;
5-methoxy-2,4-disulfamyl (α-bromo)propionanilide;
5-nitro-2,4-disulfamyl (α-fluoro, α-methyl)propionanilide;
5-methyl-2,4-disulfamyl (α-chloro)phenylacetanilide;
5-propoxy-2,4-disulfamyl (α-iodo, α-methyl)phenylacetanilide;
5-chloro-2,4-sulfamyl (α-chloro)-phenylpropionanilide;
5-chloro-2,4-disulfamyl (α-chloro)heptanoanilide;
5-propyl-2,4-disulfamyl (α-chloro)phenylbutyranilide;
5-chloro-2,4-disulfamyl (α-chloro)diphenylacetanilide;
5-bromo-2,4-disulfamyl (α-chloro)(p-methylphenyl)acetanilide;
5-bromo-2,4-disulfamyl (α-chloro)(p-ethylphenyl)acetanilide;
5-methyl-2,4-disulfamyl (α-chloro)acetanilide;
5-chloro-2,4-disulfamyl (α-chloro)acetanilide;
5-bromo-2,4-disulfamyl (α-bromo)isobutyranilide;
5-chloro-2,4-disulfamyl (α-chloro)valeranilide;
5-chloro-2,4-disulfamyl (α-chloro)phenylacetanilide;
5-fluoro-2,4-disulfamyl (α-chloro)isobutyranilide;
5-acetyl-2,4-disulfamyl (α-chloro)valeranilide;
5-trifluoromethyl-2,4-disulfamyl (α-chloro)acetanilide;
5-butyryl-2,4-disulfamyl (α-chloro)acetanilide;
5-fluoro-2,4-disulfamyl (α-chloro)acetanilide;
5-acetyl-2,4-disulfamyl (α-bromo)isobutyranilide;
5-fluoro-2,4-disulfamyl (α-bromo)acetanilide.

It has been surprisingly found that the above described 5-substituted-2,4-disulfamyl (α-halo)acylanilides are also highly effective diuretic agents.

It has been unexpectedly found that these compounds may be prepared by the interaction of a selected (α-halo) acid anhydride and a 5-substituted-2,4-disulfamyl aniline in which the substituent is selected from the group consisting of chloro, fluoro, bromo, nitro, trifluoromethyl, alkanoyl containing 2 to 4 carbon atoms and alkoxy and alkyl each containing from 1 to 3 carbon atoms. The α halo acid anhydride may be represented by the following formula:

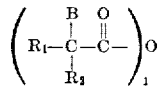

wherein:

B is selected from the group consisting of fluoro, chloro, bromo and iodo, and $R_1$ and $R_2$ are selected from the group consisting of hydrogen, alkyl containing from 1 to 3 carbon atoms, phenyl and aralkyl and alkaryl each containing from 7 to 8 carbon atoms. For example, the above described 5-substituted-2,4-disulfamyl (α halo)acylanilides may each, respectively, be prepared by the interaction of the following pairs of reactants: chloracetic anhydride and 5-chloro-2,4-disulfamyl aniline; chloracetic anhydride and 5-bromo-2,4-disulfamyl aniline; α-bromopropionic anhydride and 5-methoxy-2,4-disulfamyl aniline; α-fluoroisobutyric anhydride and 5-nitro-2,4-disulfamyl aniline; α-chlorophenylacetic anhydride and 5-methyl-2,4-disulfamyl aniline; α-iodo-α-methylphenylacetic anhydride and 5-propoxy-2,4-disulfamyl aniline; α-chlorophenylpropionic anhydride and 5-chloro-2,4-disulfamyl aniline; α-chloroheptanoic anhydride and 5-chloro-2,4-disulfamyl aniline; α-chlorophenylbutyric anhydride and 5-propyl-2,4-disulfamyl aniline; α-chlorodiphenylacetic anhydride and 5-chloro-2,4-disulfamyl aniline; α-chloro (-p-methylphenyl)acetic anhydride and 5-bromo-2,4-disulfamyl aniline; 2-chloro (-p-ethylphenyl)acetic anhydride and 5-bromo-2,4-disulfamyl aniline; chloracetic anhydride and 5-methyl-2,4-disulfamyl aniline; 5-chloro-2,4-disulfamylaniline and α-chloracetic anhydride; 5-bromo-2,4-disulfamylaniline and α-chloroisobutyric anhydride; 5-chloro-2,4-disulfamylaniline and α-chlorovaleric anhydride; 5-chloro-2,4-disulfamylaniline and α-chlorophenylacetic anhydride; 5-fluoro-2,4-disulfamylaniline and α-chloroisobutyric anhydride; 5-acetyl-2,4-disulfamylaniline and α-chlorovaleric anhydride; 5-trifluoromethyl-2,4-disulfamylaniline and α chloracetic anhydride; 5-butyryl-2,4-disulfamylaniline and α chloroacetic anhydride; 5-fluoro-2,4-disulfamylaniline and α-chloroacetic anhydride; 5-acetyl-2,4-disulfamylaniline and α bromoisobutyric anhydride; 5-fluoro-2,4-disulfamylaniline and α bromoacetic anhydride. Although the above described acylanilides may be prepared by reaction of the substituted aniline with (α halo)acylchlorides or (α halo)acid esters, it is preferable to employ the (α halo)acid anhydrides.

The reaction is generally effected by heating a mixture of the selected α halo acid anhydride with a 5-substituted 2,4-disulfamylaniline at a temperature of from about 60° to about 100° C. Usually a reaction time of from about 1 to about 4 hours is found to give excellent yield of the desired product. Heating for longer periods of time may result in decreased yield. Generally, a 1:1 molar ratio of the reactants may be employed. It is preferred to employ a large excess for example from 100 to 300% molar excess, of the selected acid anhydride. Intimate mixing of the reactants while heating is found particularly helpful, although not essential, since an excellent yield of the desired product is obtained. During the course of the reaction, it is at time found helpful to add a solvent, particularly if the reaction mixture should solidify, thus necessitating prolonged heating which may lead to reduced yield of the product. Liquid halogenated hydrocarbons, for example, chloroform, are found to be particularly suitable solvents. After the reaction is complete, the reaction mixture is treated with water to hyrdolyze unreacted anhydride. The solid residue is then recrystallized from acetone to give the desired 5-substituted-2,4-disulfamyl (α halo)acylanilide.

The above described 3,6-disubstituted-7-sulfamylbenzothiadiazine dioxides may be prepared by reacting a selected 5-substituted-2,4-disulfamyl (α halo)acylanilides with appropriate amines. For example, the above described substituted-benzothiadiazine dioxides may be prepared by reacting a 5-substituted-2,4-disulfamyl (α halo) acylanilide as described above with suitable amine, for example, where Y is a heterocyclic radical, such as piperidine, pyrrole, pyrrolidine and morpholine, where Y is

ammonia, aliphatic amines such as methyl, dimethyl, dipropyl, ethylmethyl, methylpropyl and ethylpropyl amine; aromatic amines such as aniline, N-methylaniline; alkaryl amines such as o-toluidine, p-toluidine, p-ethylaniline and the various isomeric xylidines and aralkyl amines such as benzylamine and α and β phenylethylamine.

The above described 3,6-disubstituted-7-sulfamylbenzothiadiazine dioxides in which Z is a heterocyclic radical may be prepared by reacting a 5-substituted-2,4-disulfamyl (α halo)acylanilide with an amine such as pyridine, pyrazine, thiazole, or pyrimidine.

The compounds in which Z is

or an N-alkylheterocyclic radical may be prepared by reacting a 5-substituted-2,4-disulfamyl (α-halo)acylanilide with a suitable tertiary amine such as trialkyl amines, for example, triethylamine, trimethylamine, tripropylamine, dimethylethylamine and diethylmethylamine; dialkylaryl amines, for example, dimethyl aniline, dimethyl-o-toluidine, diethyl-p-toluidine and methylethylaniline; alkyldiarylamines, for example, methyldiphenylamine and ethyldiphenylamine; N-alkyl, N-aralkyl, arylamines, for example, N-ethyl, N-benzylaniline and N-methyl, N-benzylaniline, or N-methylpiperidine, N-methylpyrrole, N-methylpyrrolidine, N-ethylpiperidine, N-ethylpyrrolidine and so forth.

An alternative process for the preparation of the compounds in which Z is

or an N-alkylheterocyclic ring is the treatment of the compounds in which Y is

or a heterocyclic ring with lower alkyl halides or sulfate esters for example, alkyl chlorides, bromides and iodides or alkyl sulfates, to provide zwitter-ion compounds as exemplified in the above formula.

The process of preparing the above described 3,6-disubstituted-7-sulfamylbenzothiadiazine dioxides comprises heating a molar equivalent of the selected amine with a suitable 5-substituted-2,4-disulfamyl-(α halo) acylanilide. Since hydrogen halide gas is a by-product of the reaction, a molar quantity of a hydrogen halide acceptor should be present in the reaction mixture. The hydrogen halide acceptor prevents consumption of the amine reagent part of which because of the formation of the amine hydrohalide would not react with the acylanilide. The hydrogen halide acceptor may be an alkaline reagent. By "alkaline reagent" as used in this disclosure is meant an oxide, hydroxide, carbonate or bicarbonate of an alkali metal, for example, sodium, potassium or lithium, or of an alkaline earth metal, for example, barium, calcium or magnesium. Alternatively, the selected amine reagent may be employed in a 2:1 molar ratio, in the absence of an alkaline reagent, the second mole of amine acting as the hydrogen halide acceptor.

It is preferred but not essential to use large excesses of the amine for best yields of the desired product. There appears to be no practical limit to the excess of amine to be employed, excellent yields being obtained when up to 1000% molar excess is employed. The large excesses of amine have further advantage in that they may also act as solvent for the reaction.

For best yields, the reaction is usually carried out at between from about 20° to about 120° C. for from about 1 to about 12 hours. Heating at higher temperatures and for longer periods of time may lead to reduced yield of the desired product. It is preferred to use substantially anhydrous reagents although the presence of a minor amount of water does not seriously reduce the yield of product. It is often advantageous, but not necessary, to employ a solvent in the reaction, since the solvent permits a more intimate contact of the reactants. As mentioned above, the large excesses of the selected amine may act as solvent for the reaction. Dimethylformamide is also found to be a suitable reaction solvent.

After the reaction is complete, the product may be obtained by conventional methods. One such method involves the removal of excess amine at reduced pressure. The residue is then triturated with water, filtered and dried to obtain the crude product which may then be purified by recrystallization methods. Water and acetone are found to be particularly suitable recrystallization solvents. The product may also be purified by dissolving in aqueous acid such as solutions of hydrohalic acid, e.g. hydrochloric acid and hydrobromic acid, sulfuric acid and so forth, and reprecipitation with alkali, for example, alkali metal carbonate, bicarbonate or hydroxide. The reprecipitated product is then filtered and dried.

The ideal diuretic agent should principally have an enhancing effect on salt as well as water excretion. Additionally, it should maintain a sustained electrolyte balance of body fluids, for example, maintain normal pH values, normal potassium and bicarbonate levels and effect an equivalent excretion of sodium and chloride ions on a sustained basis. Further, a diuretic agent should have a continued effectiveness during daily administration for protracted periods of time. Many diuretics of the prior art are limited in therapeutic application since they do not possess all of the above described properties. Some cause metabolic acidosis by increasing urinary pH; others cause increased potassium and bicarbonate ion elimination and no increase in chloride elimination. Many diuretics are not readily tolerated in prolonged therapy. Some diuretics initially possess many of these properties but on prolonged application either rapidly lose their desired effects or demonstrate a lack of continuous effective action particularly in salt elimination. Because the use of these diuretics in therapy results in a number of undesirable effects, they have only limited application since they may be used under only seriously restricted conditions. Generally, certain diuretics are used in combination with other diuretics so that the combination possesses an appreciable number of the above described properties.

The therapeutic agents of the present invention possess a number of the properties of an ideal diuretic which makes them valuable compounds for therapeutic application.

The therapeutic agents of this invention may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The physician will determine the dosage of the present therapeutic agents which will be most suitable and it will vary with the form of administration and the particular compound chosen, and furthermore, it will vary with the particular patient under treatment. He will generally wish to initiate treatment with small dosages substantially less than the optimum dose of the compound and increase the dosage by small increments until the optimum effect under the circumstances is reached. It will generally be found that when the composition is administered orally, larger quantities of the active agent will be required to produce the same effect as a smaller quantity given parenterally. The compounds are useful in the same manner as other diuretics and the dosage level is of the same order of magnitude as is generally employed with these other therapeutic agents. The therapeutic dosage will generally be from 500 to 2000 milligrams per day although it may be administered in several different dosage units. Tablets containing from 250 to 500 mg. of active agent are particularly useful.

In the foregoing, reference is made to pharmacologically acceptable anions and cations. Examples of a pharmacologically acceptable anion are iodide, chloride, bromide, sulfate, methylsulfate, acetate, propionate, tartrate, citrate, gluconate, and so forth. The term, "pharmacologically acceptable anion" has a definite meaning to one skilled in the art. It is defined as non-toxic anion of any of the simple acids commonly used in pharmacology to neutralize basic medicinal agents when the salt thereof is to be used therapeutically. The pharmacological activity of the molecule is primarily a function of the cation, the anion serving chiefly to supply electrical neutrality. "Pharmacologically acceptable cations" also has a definite meaning to one skilled in the art. It is defined as a non-toxic cation of basic compounds commonly used in pharmacology to neutralize acid medicinal agents when the salt thereof is to be used therapeutically. The pharmacological activity of the molecule is primarily a function of the anion, the cation serving chiefly to supply electrical neutrality. Commonly employed pharmacologically acceptable cations are, for example, sodium, potassium, calcium, and magnesium. These acid and base addition salts of the compounds of the present invention may be prepared employing conventional procedures. One such procedure involves treating the subject compounds with an aqueous solution containing an equivalent amount of the reagents, i.e. the pharmacologically acceptable base, followed by concentration of the resultant mixture to obtain the desired product. Pharmacologically acceptable acids are those which contain the anions described above. Pharmacologically acceptable bases are those which contain the cations described above. Such bases may be, for example, oxides, hydroxides, carbonates or bicarbonates.

The above described 5-substituted-2,4-disulfamylanilines may be prepared by procedures described in the literature, for example, the general procedure described in Monatsh. Chem. vol. 48, p. 87 (1927) which involves the treatment of a meta-substituted aniline with from 10 to 20 parts by weight of chlorosulfonic acid followed by the gradual addition of from about 90 to 170 parts by weight of sodium chloride. The resultant mixture is heated at approximately 150° C. for about 2 hours after which the reaction mixture is poured into water and the resultant 5-substituted aniline-2,4-disulfonyl chloride is filtered and is then treated with concentrated ammonium hydroxide by standard procedures to obtain the corresponding disulfonamide. The meta-substituted anilines, for example, meta-chloro, meta-fluoro, meta-bromo, meta-nitro, meta-alkanoyl, meta-alkyl, meta-trifluoromethyl and meta-alkoxy anilines, may be readily obained or prepared by standard procedures known to one skilled in the art. The α-haloacid anhydride may be prepared by conventional procedures, for example, heating the corresponding α-haloacid in excess acetic anhydride, followed by removal of the acetic anhydride-acetic acid mixture so formed leaving the desired α-haloacid anhydride. The above procedure is commonly employed in the art. Alternatively, the anhydride may be prepared by sublimation in vacuo of the corresponding α-haloacid. Further, such anhydrides may be prepared by the interaction of the sodium salt of the selected α-haloacid and the corresponding α-haloacylhalide, a well-known procedure.

The following examples are given by way of illustration and are not to be construed as limitations of this invention many variations of which are possible within the scope and spirit thereof.

EXAMPLE I

A mixture of 2 g. (0.007 mole) of 5-chloro-2,4-disulfamylaniline and 5.0 g. (0.029 mole) of α chloroacetic anhydride was heated with stirring at 100° C. for two hours. The solid reaction mixture was then triturated in 50 ml. of water after which the mixture was filtered, washed with water and dried to obtain 2.1 g. of 5-chloro-2,4-disulfamyl (α chloro)acetanilide. The product was recrystallized from acetone-ether to obtain a pure sample, M.>360° C. Elemental analysis gave the following results:

Calculated for: $C_8H_9O_5N_3Cl_2S_2$: C, 26.53; H, 2.50; N, 11.60. Found: C, 26.41; H, 2.51; N, 11.90.

EXAMPLE II

A mixture of 9.3 g. (0.035 mole) of 5-methyl-2,4-disulfamyl aniline and 25 g. (0.15 mole) of α chloroacetic anhydride was heated at 60° C. After 15 minutes the mixture solidified. Fifty milliliters of chloroform were then added and heating was continued for a total of 3 hours. The mixture was then cooled, filtered and washed with chloroform. The solid residue was then triturated with 50 ml. of water, filtered and then recrystallized from acetone after treatment of the hot acetone solution with activated carbon. Eight grams of 5-methyl-2,4-disulfamyl (α chloro)acetanilide, M. 222°–223° C. (d.), was obtained. Elemental analysis of the product agreed with the calculated values.

EXAMPLES III—XVII

A number of 5-substituted-2,4-disulfamyl (α halo)-acylanilides were prepared according to the procedures described in Examples I and II. The experimental data is summarized in Table I in which is given the products and reactants (substituted anilines and α halo acid anhydrides).

*Table 1*

| | 5-substituted-2,4-disulfamyl (α halo) acylanilide | 5-substituent of 5-substituted-2,4-disulfamyl aniline | (α halo) acid anhydride | Molar Ratio | Reaction Temp. (° C.) | Reaction Time (hrs.) |
|---|---|---|---|---|---|---|
| III | 5-bromo-2,4-disulfamyl (α chloro) acetanilide. | bromo | α chloroacetic anhydride | 4:1 | 100 | ½ |
| IV | 5-methoxy-2,4-disulfamyl (α bromo) propionanilide. | methoxy | α bromopropionic anhydride | 2:1 | 100 | 2 |
| V | 5-nitro-2,4-disulfamyl (α fluoro, α methyl)propionanilide. | nitro | α fluoroisobutyric anhydride | 3:1 | 60 | 3 |
| VI | 5-methyl-2,4-disulfamyl (α chloro) phenylacetanilide. | methyl | (α chloro) phenylacetic anhydride. | 1:1 | 100 | 3 |
| VII | 5-propoxy-2,4-disulfamyl (α iodo, α methyl)phenylacetanilide. | propoxy | (α iodo)(α methyl) phenylacetic anhydride. | 1:1 | 100 | 3 |
| VIII | 5-chloro-2,4-disulfamyl (α chloro) phenylpropionanilide. | chloro | (α chloro) phenylpropionic anhydride. | 1:1 | 100 | 3 |
| IX | 5-chloro-2,4-disulfamyl (α chloro) butyroanilide. | do | α chlorobutyric anhydride | 3:1 | 60 | 3 |
| X | 5-propyl-2,4-disulfamyl (α chloro)phenylbutyranilide. | propyl | (α chloro) phenylbutyric anhydride. | 2:1 | 100 | ½ |
| XI | 5-chloro-2,4-disulfamyl (α chloro)diphenylacetanilide. | chloro | (α chloro) diphenylacetic anhydride. | 2:1 | 100 | 1 |
| XII | 5-bromo-2,4-disulfamyl (α chloro)(-p-methylphenyl) acetanilide. | bromo | (α chloro)-p-methylphenyl acetic anhydride. | 1:1 | 100 | 3 |
| XIII | 5-bromo-2,4-(α chloro)(-p-ethylphenyl) acetanilide. | do | (α chloro)-p-ethylphenyl acetic anhydride. | 1:1 | 100 | 3 |
| XIV | 5-chloro-2,4-disulfamyl (α chloro) acetanilide. | chloro | α chloroacetic anhydride | 4:1 | 60 | 3 |
| XV | 5-bromo-2,4-disulfamyl (α bromo) isobutyranilide. | bromo | α chloroisobutyric anhydride | 3:1 | 100 | ½ |
| XVI | 5-chloro-2,4-disulfamyl (α chloro) valeranilide. | chloro | α chlorovaleric anhydride | 3:1 | 60 | 2 |
| XVII | 5-chloro-2,4-disulfamyl (α chloro) phenylacetanilide. | do | (α chloro) phenyl-acetic anhydride. | 2:1 | 100 | 2 |

NOTE.—In Table I, Molar Ratio refers to molar ratio of anhydride to aniline compound.

EXAMPLE XVIII

A mixture of 7.3 g. (0.024 mole) of 5 chloro-2,4-disulfamyl (α chloro) acetanilide and 34.4 g. (0.40 mole) of piperidine was heated with stirring at 100° C. for 2 hours. The excess piperidine was removed at reduced pressure and the solid residue triturated with water. The solid mixture was dissolved in an equivalent amount of 10% hydrochloric acid, the resultant solution treated with activated carbon and filtered. The resultant solution was adjusted to pH of about 8.0 with sodium bicarbonate where the product precipitated. After washing and drying, the product was recrystallized from acetone to obtain pure 3 - (N - piperidinomethyl) - 6 - chloro - 7 - sulfamylbenzothiadiazine dioxide, M. 267–267.5° C. Elemental analysis gave the following results:

Calculated for: $C_{13}H_{17}O_4N_4S_2Cl$: C, 39.74; H, 4.36; N, 14.26. Found: C, 39.97; H, 4.48; N, 14.08.

EXAMPLE XIX

A mixture of 2.73 g. (0.008 mole) of 5-methyl-2,4-disulfamyl (α chloro) acetanilide, 6.4 g. (0.08 mole) of piperidine and 10 ml. of dimethylformamide was allowed to stand at room temperature for 12 hours. Dimethylformamide was stripped at reduced pressure, leaving a gummy oil which was treated with 50 ml. of water. The residue was then treated with a solution of sodium bicarbonate until all the solid dissolved. The solution was adjusted to pH 10 and concentrated at reduced pressure to obtain an insoluble gummy residue. After cooling in an ice bath, the residue was treated with excess concentrated hydrochloric acid thus precipitating the hydrochloride of 3-(N-piperidinomethyl)-6-methyl - 7 - sulfamylbenzothiadiazine dioxide (3.3 g.), M. 291°–293° C. The product was further purified by dissolving in hot water, treating with activated carbon, filtering while hot and precipitating by cooling the hot solution after adding 50 ml. of concentrated hydrochloric acid. The purified product melted at 293°–294° C. (d.). Elemental analysis gave results which agree with the theoretical values.

zine dioxides in which "Y" is

or a heterocyclic radical were prepared according to the procedures described in Examples XVIII to XXI. The experimental data is summarized in Table II.

*Table II*

| | 3,6-disubstituted-7-sulfamyl benzothiadiazine dioxide | | Reactants | | A | B | C |
|---|---|---|---|---|---|---|---|
| | 6-substituent | 3-substituent | Amine | Acylanilide | | | |
| XXII | bromo | N-pyrrylmethyl | pyrrole | 5-bromo-2,4-disulfamyl (α chloro) acetanilide. | 5:1 | 80 | 2 |
| XXIII | methoxy | α-N-pyrolidino-α-ethyl | pyrrolidine | 5-methoxy-2,4-disulfamyl (α-bromo)propionanilide. | 10:1 | 120 | 1 |
| XXIV | methyl | α-N-morpholino-α-benzyl | morpholine | 5-methyl-2,4-disulfamyl (α chloro) phenylacetanilide. | 2:1 | 100 | 4 |
| XXV | chloro | β-N-piperidino-β-phenylethyl | piperidine | 5-chloro-2,4-disulfamyl (α chloro) phenylpropionanilide. | 10:1 | 80 | 2 |
| XXVI | methoxy | α-N-piperidino-α-ethyl | do | 5-methoxy-2,4-disulfamyl (α bromo) propionanilide. | 5:1 | 100 | 3 |
| XXVII | nitro | 2-N-piperidino-2-propyl | do | 5-nitro-2,4-disulfamyl (α fluoro, α methyl)propionanilide. | 5:1 | 120 | 1 |
| XXVIII | propoxy | α-N-pyrrolidino-α-phenylethyl | pyrrolidine | 5-propoxy-2,4-disulfamyl (α iodo, α methyl)phenylacetanilide. | 2:1 | 80 | 4 |
| XXIX | nitro | 2-N-methylamino-2-propyl | methylamine | 5-nitro-2,4-disulfamyl (α fluoro, α methyl)propionanilide. | 10:1 | 20 | 4 |
| XXX | propoxy | α-N-propylamino-α-phenylethyl | propylamine | 5-propoxy-2,4-disulfamyl (α iodo, α methyl) phenylacetanilide. | 10:1 | 80 | 1 |
| XXXI | chloro | α-N-anilino-α-butyl | aniline | 5-chloro-2,4-disulfamyl (α chloro) butyroanilide. | 5:1 | 120 | 1 |
| XXXII | propyl | γ-N-o-toluidino-γ-phenylpropyl | o-toluidine | 5-propyl-2,4-disulfamyl (α chloro) phenylbutyranilide. | 1:1 | 120 | 3 |
| XXXIII | chloro | N-ethyl-N-methylamino (diphenyl)methyl | ethylmethylamine | 5-chloro-2,4-disulfamyl (α chloro) diphenylacetanilide. | 5:1 | 100 | 4 |
| XXXIV | bromo | α-N,N-dipropylamino-α-p-methylbenzyl | dipropylamine | 5-bromo-2,4-disulfamyl (α chloro) (p-methylphenyl) acetanilide. | 10:1 | 100 | 2 |
| XXXV | do | α-N,N-dimethylamino-α-p-ethylbenzyl | dimethylamine | 5-bromo-2,4-disulfamyl (α chloro) (p-ethylphenyl) acetanilide. | 5:1 | 80 | 1 |
| XXXVI | chloro | N-benzylaminomethyl | benzylamine | 5-chloro-2,4-disulfamyl (α chloro) acetanilide. | 5:0 | 90 | 2 |
| XXXVII | nitro | 2-N-phenylethylamino-2-propyl | phenylethylamine | 5-nitro-2,4-disulfamyl (α fluoro, α methyl) propionanilide. | 1:1 | 120 | 4 |
| XXXVIII | methoxy | α-N-p-toluidino-α-ethyl | p-toluidine | 5-methoxy-2,4-disulfamyl (α bromo) propionanilide. | 4:1 | 100 | 3 |
| XXXIX | methyl | N-methylanilinomethyl | N-methylaniline | 5-methyl-2,4-disulfamyl (α chloro) acetanilide. | 2:1 | 20 | 12 |
| XL | bromo | 2-amino-2-propyl | ammonia | 5-bromo-2,4-disulfamyl (α chloro) isobutyranilide. | 5:1 | 20 | 8 |
| XLI | chloro | 1-amino-1-butyl | do | 5-chloro-2,4-disulfamyl (α chloro) valeranilide. | 10:1 | 20 | 4 |
| XLII | do | α-aminobenzyl | do | 5-chloro-2,4-disulfamyl (α chloro) phenylacetanilide. | 10:1 | 10 | 12 |

In Table II:
"A" is the molar ratio of amine to acylanilide.
"B" is the reaction temperature.
"C" is the reaction time.

EXAMPLE XX

A mixture of 3.6 g. (0.01 mole) of 5-chloro-2,4-disulfamyl (α chloro) acetanilide in 10 ml. of concentrated NH$_4$OH was allowed to stand at 20° C. for 8 hours. The mixture was evaporated under reduced pressure to obtain crude product which was recrystallized from acetone to give pure 3-(aminomethyl)-6-chloro-7-sulfamylbenzothiadiazine dioxide.

EXAMPLE XXI

The procedure of Example XIX, employing 0.008 mole of piperidine in the presence of an equimolar amount of sodium bicarbonate with comparable results.

EXAMPLES XXII–XLII

A number of 3,6-disubstituted-7-sulfamylbenzothiadiazine dioxides in which "Y" is

EXAMPLE XLIII

A mixture of 1.03 g. (0.003 mole) of 5-chloro-2,4-disulfamyl (α chloro) acetanilide and 5 ml. of pyridine was heated for 2 hours at 100° C. A solid precipitate formed and was freed of excess pyridine at reduced pressure. The precipitate was triturated with water, filtered, washed and dried, yielding 1.01 g. of 3-(N-pyridiniummethyl)-6-chloro-7-sulfamylbenzothiadiazine dioxide. Recrystallization from water gave a pure sample, M. 278–279° C. Elemental analysis gave the following results:

Calculated for: $C_{13}H_{11}O_4N_4S_2Cl$: C, 40.36; H, 2.87; N, 14.48. Found: C, 39.81; H, 2.85; N, 14.17.

EXAMPLE XLIV

A mixture of 2.73 g. (0.008 mole) of 5-methyl-2,4-disulfamyl (α chloro) acetanilide and 6.3 g. (0.08 mole) of pyridine in 10 ml. of dimethylformamide was heated at 100° C. for one hour. The reaction mixture was cooled in ice and diluted with a 1% solution of sodium bicarbonate. The crude product separated, was filtered, washed with water and dried. The crude product was suspended in water and 40% NaOH solution was added to clear the solution. Carbon dioxide gas was passed into the solution to precipitate 3-(N-pyridiniummethyl)-6-methyl-7-sulfamylbenzothiadiazine dioxide which was filtered, washed with water and dried (2.52 g.) M. 287°–288° C. (d.).

EXAMPLE XLV

The procedure of Example XLIII was repeated with the addition of 0.004 mole of potassium carbonate with comparable results.

EXAMPLES XLVI–LII

A number of 3,6-disubstituted-7-sulfamylbenzothiadiazine dioxides in which Z is a heterocyclic radical were prepared by the procedures described in Examples XLII to XLIV. The experimental data is summarized in Table III.

EXAMPLE LXIV

One mole of α chloro phenylacetic acid was refluxed with one mole of acetic anhydride. After 3 hours, the resultant acetic anhydride-acetic acid mixture was removed by distillation at reduced pressure. The residue was crude α chloro phenylacetic anhydride which was then purified by recrystallization from benzene.

In the same manner, other α chloro acid anhydrides employed in the above examples were prepared.

EXAMPLE LXV

The hydrochloride of 3-(N-piperidinomethyl)-6-chloro-7-sulfamylbenzothiadiazine dioxide was prepared by dissolving this compound in an aqueous solution containing an equivalent molar amount of hydrochloric acid. The solution was then concentrated under reduced pressure to obtain the hydrochloride. This procedure was repeated

*Table III*

| | 3, 6-disubstituted-7-sulfamylbenzothiadiazine dioxides | | Reactants | | A | B | C |
|---|---|---|---|---|---|---|---|
| | 3-substituent | 6-substituent | Amine | Acylanilide | | | |
| XLVI | pyrazinium-methyl | bromo | pyrazine | 5-bromo-2,4-disulfamyl (α chloro) acetanilide. | 10:1 | 100 | 2 |
| XLVII | 1-N-thiazolium-1-ethyl | methoxy | thiazine | 5-methoxy-2,4-disulfamyl (α bromo) propionanilide. | 5:1 | 80 | 4 |
| XLVIII | 2-N-pyridinium-2-propyl | nitro | pyridine | 5-nitro-2,4-disulfamyl (α fluoro, α methyl) propionanilide. | 5:1 | 20 | 8 |
| XLIX | α-N-thiazolium-α-phenylethyl | propoxy | thiazole | 5-propoxy-2,4-disulfamyl (α iodo, α methyl) phenylacetanilide. | 2:1 | 120 | 4 |
| L | N-pyrimidinium-methyl | chloro | pyrimidine | 5-chloro-2,4-disulfamyl (α chloro) acetanilide. | 10:1 | 100 | 2 |
| LI | α-N-pyridinium-α phenylethyl. ) | propoxy | pyridine | 5-propoxy-2,4-disulfamyl (α iodo, α methyl) phenylacetanilide. | 2:1 | 20 | 10 |
| LII | N-thiazolium-methyl | chloro | thiazole | 5-chloro-2,4-disulfamyl (α chloro) acetanilide. | 10:1 | 100 | 2 |

EXAMPLES LIII TO LXIII 3,6-disubstituted-7-sulfamylbenzothiadiazine dioxides in which Z is

or an N-alkylheterocyclic radical were prepared employing the procedures described in Examples XVIII to XXI. The experimental data are tabulated in Table IV:

employing a solution of hydrogen chloride in ethyl alcohol with comparable results.

This procedure was employed for the preparation of other acid addition salts, i.e. the hydrobromide, hydriodide and sulfate.

EXAMPLE LXVI

The potassium salt of 3-(N-piperidinomethyl)-6-methyl-7-sulfamylbenzothiadiazine dioxide was prepared by dissolving the compound in an aqueous solution, containing an equivalent molar amount of potassium carbonate.

*Table IV*

| | 3, 6-disubstituted-7-sulfamylbenzothiadiazine dioxides | | Reactants | | A | B | C |
|---|---|---|---|---|---|---|---|
| | 3-substituent | 6-substituent | Amine | Acylanilide | | | |
| LIII | N-methylpiperidinomethyl | chloro | N-methylpiperidine. | 5-chloro-2,4-disulfamyl (α chloro) acetanilide. | 4:1 | 100 | 3 |
| LIV | N-methylpyrrylmethyl | bromo | N-methylpyrazine. | 5-bromo-2,4-disulfamyl (α chloro) acetanilide. | 2:1 | 20 | 12 |
| LV | 2-N,N,N-trimethylamino-2-propyl | nitro | trimethylamine | 5-nitro-2,4-disulfamyl (α fluoro, α methyl) propionanilide. | 10:1 | 20 | 8 |
| LVI | N,N,N,-triethylaminomethyl | chloro | do | 5-chloro-2,4-disulfamyl (α chloro) acetanilide. | 5:1 | 100 | 3 |
| LVII | N,N,N-tripropylaminomethyl | do | tripropylamine | 5-chloro-2,4-disulfamyl (α chloro) acetanilide. | 5:1 | 100 | 3 |
| LVIII | N,N,N-triethylaminomethyl | methyl | triethylamine | 5-methyl-2,4-disulfamyl (α chloro) acetanilide. | 5:1 | 100 | 2 |
| LIX | α-N-methylpyrrolidino-α-ethyl. | methoxy | N-methylpyrrolidine. | 5-methoxy-2,4-disulfamyl (α bromo) propionanilide. | 4:1 | 100 | 3 |
| LX | N-methylpyrrylmethyl | bromo | N-methylpyrazine. | 5-bromo-2,4-disulfamyl (α chloro) acetanilide. | 2:1 | 120 | 2 |
| LXI | α-N,N-dimethyl p. toluidino-α-ethyl. | methoxy | N,N-dimethyl-p. toluidine. | 5-methoxy-2,4-disulfamyl (α bromo) propionanilide. | 4:1 | 100 | 3 |
| LXII | N,N-diethyl,N-benzyl-aminomethyl. | chloro | N,N-diethyl-benzylamine. | 5-chloro-2,4-disulfamyl (α chloro) acetanilide. | 5:1 | 100 | 4 |
| LXIII | α-N,N-dimethylanilino-α-butyl. | do | N-N,dimethyl-aniline. | 5-chloro-2,4-disulfamyl (α chloro) valeranilide. | 5:1 | 100 | 4 |

15

The resultant solution was evaporated under reduced pressure to obtain the potassium salt. The procedure was repeated employing aqueous sodium bicarbonate, aqueous barium hydroxide and alcoholic sodium hydroxide to obtain the corresponding metal salts.

EXAMPLE LXVII

The hydrochloride of 3-(N-piperidinomethyl)-6-chloro-7-sulfamylbenzothiadiazine dioxide was dissolved in water to which was then added an equivalent molar amount of silver acetate. The silver chloride precipitate which formed was filtered and the filtrate evaporated to obtain the acetic acid addition salt of 3-(N-piperidinomethyl)-6-chloro-7-sulfamylbenzothiadiazine dioxide.

In a similar manner, the tartaric, citric, gluconic and propionic acid addition salts were prepared.

16

EXAMPLE LXX

Into the tablet base of Example LVIII there is incorporated a sufficient amount of 3-(N-piperidinomethyl)-6-chloro-7-sulfamylbenzothiadiazine dioxide hydrochloride to provide tablets each containing 0.5 g. of active ingredient.

EXAMPLES LXXI–LXXVII

Additional 5-substituted-2,4-disulfamyl ($\alpha$ halo)acylanilides were prepared according to the procedures described in Examples I and II. The experimental data are given in Table V.

Table V

| | 5-substituted-2,4-disulfamyl ($\alpha$ halo) acylanilide | 5-substituent of 5-substituted-2,4-disulfamyl aniline | ($\alpha$ halo) acid anhydride | Molar Ratio | Reaction Temp. (° C.) | Reaction Time (hrs.) |
|---|---|---|---|---|---|---|
| LXXI | 5-fluoro-2,4-disulfamyl ($\alpha$ chloro)-isobutyranilide. | fluoro | $\alpha$ chloro isobutyric anhydride | 3:1 | 100 | 1 |
| LXXII | 5-acetyl-2,4-disulfamyl ($\alpha$ chloro) valeranilide. | acetyl | $\alpha$ chloro-valeric anhydride | 2:1 | 100 | 3 |
| LXXIII | 5-trifluoro-methyl-2,4-disulfamyl ($\alpha$ chloro) acetanilide. | trifluoro-methyl | $\alpha$ chloro-acetic anhydride | 4:1 | 60 | 2 |
| LXXIV | 5-butyryl-2,4-disulfamyl ($\alpha$ chloro) acetanilide. | butyryl | do | 4:1 | 60 | 2 |
| LXXV | 5-fluoro-2,4-disulfamyl ($\alpha$ chloro) acetanilide. | fluoro | do | 3:1 | 100 | 2 |
| LXXVI | 5-acetyl-2,4-disulfamyl ($\alpha$ bromo) isobutyranilide. | acetyl | $\alpha$ bromo-isobutyric anhydride | 3:1 | 100 | 2 |
| LXXVII | 5-fluoro-2,4-disulfamyl ($\alpha$ bromo) acetanilide. | fluoro | $\alpha$ bromo-acetic anhydride | 4:1 | 100 | 1 |

EXAMPLES LXXVIII TO LXXXVI

Additional 3,6-disubstituted-7-sulfamylbenzothiadiazine dioxides were prepared according to the above described procedures. The experimental data are given in Table VI.

Table VI

| | 3,6-disubstituted-7-sulfamylbenzothiadiazine dioxides | | Reactants | | A | B | C |
|---|---|---|---|---|---|---|---|
| | 3-substituent | 6-substituent | Amine | Acylanilide | | | |
| LXXVIII | 2-amino-2-propyl | fluoro | ammonia | 5-fluoro-2,4-disulfamyl ($\alpha$ chloro) isobutyranilide. | 10:1 | 20 | 4 |
| LXXIX | 1-amino-1-butyl | acetyl | do | 5-acetyl-2,4-disulfamyl ($\alpha$ chloro) valeranilide. | 10:1 | 20 | 4 |
| LXXX | aminomethyl | trifluoro-methyl | do | 5-trifluoromethyl-2,4-disulfamyl ($\alpha$ chloro) acetanilide. | 10:1 | 20 | 12 |
| LXXXI | do | butyryl | do | 5-butyryl-2,4-disulfamyl ($\alpha$ chloro) acetanilide. | 10:1 | 20 | 8 |
| LXXXII | 2-amino-2-propyl | acetyl | do | 5-acetyl-2,4-disulfamyl ($\alpha$ bromo) isobutyranilide. | 10:1 | 20 | 12 |
| LXXXIII | N-piperidinomethyl | fluoro | piperidine | 5-fluoro-2,4-disulfamyl ($\alpha$ chloro) acetanilide. | 4:1 | 100 | 3 |
| LXXXIV | 2-N-pyrryl-2-propyl | do | pyrrole | 5-fluoro-2,4-disulfamyl ($\alpha$ chloro) isobutyranilide. | 5:1 | 20 | 8 |
| LXXXV | N-pyridinium-methyl | do | pyridine | 5-fluoro-2,4-disulfamyl ($\alpha$ bromo) acetanilide. | 5:1 | 20 | 8 |
| LXXXVI | do | trifluoro-methyl | do | 5-trifluoro-2,4-disulfamyl ($\alpha$ chloro) acetanilide. | 10:1 | 100 | 2 |

EXAMPLE LXVIII

A tablet base is prepared by blending the following ingredients in the proportion by weight indicated:

Sucrose U.S.P. _____ 82.0
Tapioca starch _____ 13.6
Magnesium stearate _____ 4.4

Into this base there is blended a sufficient amount of 3-(N - piperidinomethyl) - 6 - chloro - 7 - sulfamylbenzothiadiazine dioxide to provide tablets containing 250 mg. of active ingredient.

EXAMPLE LXIX

Into the tablet base of Example LVIII there is blended a sufficient amount of 3-(N-piperidinomethyl)-6-methyl-7-sulfamylbenzothiadiazine dioxide to provide tablets containing 0.5 g. of active ingredient.

What is claimed is:

1. The amphoteric compound and the pharmacologically acceptable acid and base addition salts thereof, said compound being selected from the group represented by the formulae:

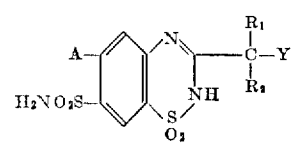

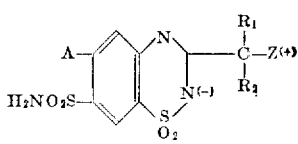

wherein:
(a) A is selected from the group consisting of Cl, F, Br, NO₂, trifluoromethyl, alkanoyl having from 2 to 4 carbon atoms and alkyl and alkoxy each having from 1 to 3 carbon atoms;
(b) $R_1$ and $R_2$ are selected from the group consisting of hydrogen, alkyl having from 1 to 3 carbon atoms, phenyl and aralkyl and alkaryl each having from 7 to 8 carbon atoms;
(c) Y is selected from the group consisting of piperidino, pyrryl, pyrrolidino, morpholino and

in which $R_1$ and $R_2$ are as defined above; and
(d) Z is selected from the group consisting of pyridinium, pyrazinium, pyrimidinium, thiazolium, N-alkylpiperidino, N-alkylpyrryl, N-alkylmorpholino, N-alkylpyrrolidino, the N-alkyl of each having from 1 to 3 carbon atoms, and

in which $R_1$ and $R_2$ are as defined above and $R_3$ is alkyl having from 1 to 3 carbon atoms.

2. A compound of the formula:

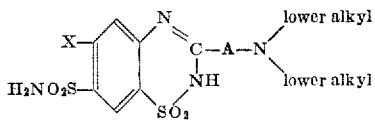

wherein X is selected from the group consisting of halogen and trifluoromethyl and A is lower alkylene.

3. 3 - (N - piperidinomethyl) - 6 - chloro - 7 - sulfamyl-benzothiadiazine dioxide.

4. 3 - (N - piperidinomethyl) - 6 - methyl - 7 - sulfamyl-benzothiadiazine dioxide.

5. 3 - (N - pyridiniummethyl) - 6 - chloro - 7 - sulfamyl-benzothiadiazine dioxide.

6. 3 - (N - pyridiniummethyl) - 6 - methyl - 7 - sulfamylbenzothiadiazine dioxide.

References Cited in the file of this patent
UNITED STATES PATENTS

| | | |
|---|---|---|
| 2,117,260 | Stuart | May 10, 1938 |
| 2,169,971 | Behnisch | Aug. 15, 1939 |
| 2,289,029 | Mietzsch et al. | July 7, 1942 |
| 2,809,194 | Novello | Oct. 8, 1957 |
| 2,910,476 | Novello | Oct. 27, 1959 |

OTHER REFERENCES

Chemical Abstracts, vol. 46, The Naming and Indexing of Chemical Compounds (1953), pages 12413–12417, call No. QD 7C4 (1953).

Novello et al.: Jour. Am. Chem. Soc., vol. 79, Apr. 1957, pages 2028–29.

UNITED STATES PATENT OFFICE
CERTIFICATE OF CORRECTION

Patent No. 3,110,716                        November 12, 1963

William M. McLamore et al.

It is certified that error appears in the above identified patent and that said Letters Patent are hereby corrected as shown below:

Column 16, lines 70 to 75, change the single bond between the 3- and 4-positions to a double bond.

Signed and sealed this 11th day of November 1969.

(SEAL)
Attest:

Edward M. Fletcher, Jr.
Attesting Officer

WILLIAM E. SCHUYLER, JR.
Commissioner of Patents